(12) United States Patent
Fukumura (10) Patent No.: US 8,241,529 B2
(45) Date of Patent: Aug. 14, 2012

(54) FLUORORESIN COMPOSITE MATERIAL, COATING FILM MADE FROM THE COMPOSITE MATERIAL AND COATED BODY WITH THE COATING FILM

(75) Inventor: Naoki Fukumura, Nara (JP)

(73) Assignee: Nippon Fusso Co., Ltd, Sakai-shi, Osaka (JP)

(*) Notice: Subject to any disclaimer, the term of this patent is extended or adjusted under 35 U.S.C. 154(b) by 338 days.

(21) Appl. No.: 12/672,700

(22) PCT Filed: Aug. 10, 2007

(86) PCT No.: PCT/JP2007/065782
§ 371 (c)(1),
(2), (4) Date: Feb. 9, 2010

(87) PCT Pub. No.: WO2009/022400
PCT Pub. Date: Feb. 19, 2009

(65) Prior Publication Data
US 2011/0039093 A1  Feb. 17, 2011

(51) Int. Cl.
*H01B 1/04* (2006.01)
*H01B 1/12* (2006.01)
*H01B 1/06* (2006.01)
*B32B 5/16* (2006.01)
*B32B 27/00* (2006.01)

(52) U.S. Cl. ............... 252/516; 252/519.33; 252/521.3; 428/421; 428/422

(58) Field of Classification Search .......... 252/516, 252/519.33, 521.3; 428/402, 421, 422
See application file for complete search history.

(56) References Cited

U.S. PATENT DOCUMENTS

| | | | | |
|---|---|---|---|---|
| 4,703,076 A | * | 10/1987 | Mori | 524/420 |
| 4,897,439 A | * | 1/1990 | Rau et al. | 524/404 |
| 5,008,042 A | * | 4/1991 | Honda et al. | 252/519.33 |
| 5,536,583 A | * | 7/1996 | Roberts et al. | 428/457 |
| 5,906,967 A | * | 5/1999 | Kato et al. | 508/106 |
| 6,228,932 B1 | * | 5/2001 | Saito | 524/502 |
| 6,367,981 B1 | * | 4/2002 | Yamamoto et al. | 384/527 |
| 2002/0051596 A1 | * | 5/2002 | Yamamoto et al. | 384/527 |

FOREIGN PATENT DOCUMENTS

| | | |
|---|---|---|
| JP | 5-112690 A | 5/1993 |
| JP | 10-251413 A | 9/1998 |
| JP | 11-241045 A | 9/1999 |
| JP | 2002-201287 A | 1/2002 |
| JP | 2002-30475 A | 7/2002 |
| JP | 2004-283699 A | 10/2004 |
| JP | 2006-192356 A | 7/2006 |

* cited by examiner

*Primary Examiner* — Mark Kopec
*Assistant Examiner* — Jaison Thomas
(74) *Attorney, Agent, or Firm* — Lawson & Weitzen, LLP; Sonia K. Guterman (57) ABSTRACT

(Problems)
To provide a coating film which excels in corrosion resistance and processability as well as high durability and little suffers from electrification.
(Means for Solving Problems)
A fluororesin composite material including: a fluororesin microencapsulating silicon carbide, an amount of the silicon carbide being 5 to 9% by weight with respect to a total of the fluororesin composite material; and at least one of polyphenylene sulfide (PPS), polyether sulphone (PES) and polyether ether ketone (PEEK).

19 Claims, 1 Drawing Sheet

FLUORORESIN COMPOSITE MATERIAL, COATING FILM MADE FROM THE COMPOSITE MATERIAL AND COATED BODY WITH THE COATING FILM

CROSS REFERENCE TO RELATED APPLICATION

This application is the National Stage of International Application No. PCT/JP2007/065782 (filed on Aug. 10, 2007), and the disclosure of which is incorporated herein by reference.

FIELD OF THE INVENTION

This invention relates to a fluororesin composite material to be applied on a surface of a substrate such as metal, glass, ceramics and so on, a coating film made from the fluororesin composite material, and a coated body with the coating film.

DESCRIPTION OF THE RELATED ART

Fluororesins have excellent heat resistance, corrosion resistance, water repellency, antifouling property, lubricity, antifriction property and so on, and are used as coating films on substrates comprising metal and so on. For example, Tokkai 2002-30475 discloses a device on which a coating film comprising a fluororesin is formed, in order to improve corrosion resistance against hydrofluoric acid.

Here, the coating film comprising the fluororesin is formed by applying and curing a fluororesin powder paint on a surface of the substrate. However, the fluororesin powder paint shrinks during the curing process, which causes a stress in a direction of the shrinkage (shrinkage stress). The shrinkage stress decreases durability of the coating film.

Also, the fluororesin has low electric conductivity, which leads to easily charge the coating film comprising the fluororesin. The electrification of the coating film is unfavorable because dust and so on are easily attached thereto.

Tokkaihei 11-241045 discloses a method for obtaining a highly-durable coating film comprising: mixing filler into a fluororesin powder paint to loosen the shrinkage stress.

Further, a use of carbon fiber as the filler provides durability as well as high electric conductivity. That is, the high electric conductivity of the carbon fiber also improves electric conductivity of the coating film and prevents electrification.

However, the use of filler raises permeability of the coating film against a chemical substance and so on. The risen permeability of the coating film causes a condition of easily corroding the coating film, which results in decreasing corrosion resistance of the coating film.

In addition, the use of filler lowers processability of the coating film, which is also problematic.

SUMMARY OF INVENTION

The present invention is to solve the above problems, and to provide a coating film which excels in corrosion resistance and processability as well as high durability and little suffers from electrification.

The present invention relates to a fluororesin composite material with smoothing, electric conductivity and durability comprising: a fluororesin including a first fluororesin microencapsulating silicon carbide and a second fluororesin having a melt flow rate larger than the first fluororesin, the melt flow rate of the first fluororesin being 0.1 to 3 g/10 minutes, the melt flow rate of the second fluororesin being 5 to 13 g/10 minutes, and an amount of the silicon carbide being 6 to 9% by weight with respect to a total of the fluororesin composite material; and at least one of polyphenylene sulfide (PPS), polyether sulphone (PES) and polyether ether ketone (PEEK).

Another embodiment of the present invention relates to the fluororesin composite material with smoothing, electric conductivity and durability, wherein the silicon carbide is whisker or flake.

Yet another embodiment of the present invention relates to the fluororesin composite material with smoothing, electric conductivity and durability, wherein an amount of the first fluororesin microencapsulating silicon carbide is 51 to 90% by weight with respect to a total of the fluororesin.

Yet another embodiment of the present invention relates to the fluororesin composite material with smoothing, electric conductivity and durability, wherein an amount of the silicon carbide is 2 to 18% by weight with respect to a total weight of the first fluororesin microencapsulating silicon carbide and the silicon carbide.

Yet another embodiment of the present invention relates to the fluororesin composite material with smoothing, electric conductivity and durability, wherein a total amount of polyphenylene sulfide (PPS), polyether sulphone (PES) and polyether ether ketone (PEEK) is 3 to 10% by weight with respect to a total weight of the fluororesin composite material.

Yet another embodiment of the present invention relates to a coating film with smoothing, electric conductivity and durability comprising: a fluororesin including a first fluororesin microencapsulating silicon carbide and a second fluororesin having a melt flow rate larger than the first fluororesin, the melt flow rate of the first fluororesin being 0.1 to 3 g/10 minutes, the melt flow rate of the second fluororesin being 5 to 13 g/10 minutes, and an amount of the silicon carbide being 6 to 9% by weight with respect to a total of the coating film; and at least one of polyphenylene sulfide (PPS), polyether sulphone (PES) and polyether ether ketone (PEEK).

Yet another embodiment of the present invention relates to a coated body having the coating film; wherein a primer layer including the fluororesin and organic titanate and the coating film are sequentially formed on a substrate.

Yet another embodiment of the present invention relates to a coated body, comprising a second coating film on the coating film, the second coating film being different from the coating film and including fluororesin.

According to one embodiment of the present invention, a first fluororesin includes silicon carbide, which enables to provide a coating film with excellent durability. Further, high electric conductivity of the silicon carbide improves electric conductivity of the coating film, which results in the coating film with little suffers from electrification.

Further, the first fluororesin microencapsulates silicon carbide, and an amount of the silicon carbide is 6 to 9% by weight with respect to a total weight of the fluororesin composite material, which results in the coating film with superior corrosion resistance.

In addition, an inclusion of at least one of polyphenylene sulfide (PPS), polyether sulphone (PES) and polyether ether ketone (PEEK) leads to the coating film with excellent processability.

Next, a second fluororesin is further included, and a melt flow rate of the second fluororesin is larger than that of the first fluororesin microencapsulating silicon carbide, which results in improving durability of the obtained coating film and suppressing elution of metal.

In addition, the melt flow rate of the first fluororesin microencapsulating silicon carbide is 0.1 to 3 g/10 minutes, which results in the coating film with a smooth surface by maintaining a condition of high electric conductivity and corrosion resistance.

Also, the melt flow rate of the second fluororesin is 5 to 13 g/10 minutes, which enables to form a smooth coating film with an increased film thickness by maintaining a condition of high corrosion resistance.

According to another embodiment of the present invention, the silicon carbide is whisker or flake, which further improves electric conductivity of the coating film. This results in the coating film with further little suffers from electrification. In addition, the coating film exhibits higher durability.

According to yet another embodiment of the present invention, an amount of the first fluororesin microencapsulating silicon carbide is 51-90% by weight with respect to a total weight of the fluororesin. The obtained coating film does not cause a bubbling and enables to suppress roughness on the surface.

According to yet another embodiment of the present invention, an amount of the silicon carbide is 2-18% by weight with respect to a total weight of the first fluororesin microencapsulating silicon carbide and the silicon carbide. A combined use of one or more the coating film having different amounts of the silicon carbide enables to prevent a shrinkage during a film forming process and provide a smooth surface.

According to yet another embodiment of the present invention, a total amount of polyphenylene sulfide (PPS), polyether sulphone (PES) and polyether ether ketone (PEEK) is 3 to 10% by weight with respect to a total weight of the fluororesin composite material. This results in decreasing process problems such as a bubbling in the coating film and improving corrosion resistance.

According to yet another embodiment of the present invention, a first fluororesin includes silicon carbide, which leads to excellent durability. High electric conductivity of silicon carbide also improves electric conductivity of the coating film, which results in the coating film with little suffers from electrification.

Further, the first fluororesin microencapsulates silicon carbide and an amount of the silicon carbide is 6 to 9% by weight with respect to a total weight of the coating film, which results in exhibiting superior corrosion resistance.

In addition, an inclusion of at least one of polyphenylene sulfide (PPS), polyether sulphone (PES) and polyether ether ketone (PEEK) leads to the coating film with excellent processability.

Next, a second fluororesin is further included, and a melt flow rate of the second fluororesin is larger than that of the first fluororesin microencapsulating silicon carbide, which results in improving durability of the coating film and suppressing elution of metal.

In addition, the melt flow rate of the first fluororesin microencapsulating silicon carbide is 0.1 to 3 g/10 minutes, which results in the coating film with a smooth surface by maintaining a condition of high electric conductivity and corrosion resistance.

Also, the melt flow rate of the second fluororesin is 5 to 13 g/10 minutes, which enables to form a smooth coating film with an increased film thickness by maintaining a condition of high corrosion resistance.

According to yet another embodiment of the present invention, a primer layer including fluororesin and organic titanate and the coating film are sequentially formed on a substrate. The entire film (the primer layer and the coating film) exhibits higher corrosion resistance.

According to yet another embodiment of the present invention, a second coating film is placed on the coating film, and the second coating film is different from the coating film and including fluororesin. This leads to higher durability. Especially, a formation of the primer layer, the coating film and the second coating film on the substrate comprising a stainless steel significantly improves the durability.

DESCRIPTION OF THE PREFERRED EMBODIMENTS

Hereinafter, embodiments of a fluororesin composite material and a coating film made by coating the fluororesin composite material according to the present invention will be explained.

A fluororesin composite material and a coating film according to the present invention comprise at least one of polyphenylene sulfide (PPS), polyether sulphone (PES) and polyether ether ketone (PEEK) in addition to the fluororesin.

The fluororesin included in the fluororesin composite material and the coating film comprises a fluororesin which microencapsulates silicon carbide (hereinafter, referred to as "first fluororesin") and a fluororesin which is different from the first fluororesin (hereinafter, referred to as "second fluororesin").

When the coating film is formed by the fluororesin composite material, the fluororesin, composite material and the coating film have the similar values for contained amounts and melt flow rate and so on of various components, and therefore hereinafter those will be explained together. In addition, when just described as "fluororesin composite material" or "coating film" in the following description, that means the fluororesin composite material or the coating film according to the present invention.

The first fluororesin microencapsulates silicon carbide. That is, the fluororesin composite material of the present invention includes silicon carbide.

Such the inclusion of silicon carbide in the first fluororesin leads to an inclusion of silicon carbide in the coating film made by coating the fluororesin composite material. This enables to relax a shrinkage stress of the coating film and improve durability of the coating film. High electric conductivity of silicon carbide improves electric conductivity of the coating film and leads to the coating film with little suffers from electrification, which results in the coating film with little suffers from dust adhesion and so on. This also prevents elution of metal.

Further, the microencapsulation of silicon carbide with the first fluororesin suppresses permeability of the coating film against a chemical substance and improves corrosion resistance, while no-microencapsulation of silicon carbide causes to increase permeability of the coating film against a chemical substance and lower corrosion resistance.

In addition, the microencapsulation of silicon carbide with the first fluororesin prevents segregation between fluororesin (the first fluororesin and the second fluororesin) and silicon carbide and stabilizes silicon carbide, which results in improving smoothing of a surface of the coating film.

The first fluororesin has a melt flow rate (MFR) of preferably 0.1 to 5 g/10 minutes and more preferably 0.5 to 3 g/10 minutes under 5 kg load at 372° C. The reasons are that the first fluororesin having MFR of less than 0.1 g/10 minutes makes it difficult to form the coating film with a smooth surface and that the first fluororesin having MFR of more than 5 g/10 minutes is unable to localize silicon carbide and decreases electric conductivity and corrosion resistance of the coating film.

In addition, MFR of the fluororesin in the coating film may be estimated, for example, based on a rule of ASTMD 1238.

For the first fluororesin, polytetrafluoroethylene (PTFE), tetrafluoroethylene-perfluoroalkyl vinyl ether copolymer (PFA), tetrafluoroethylene-hexafluoropropylene copolymer (FEP), polyvinylidene fluoride copolymer (PVDF), polychlorotrifluoroethylene copolymer (PCTFE), chlorotrifluoroethylene-ethylene copolymer (ECTFE), and tetrafluoroethylene-ethylene copolymer (ETFE) and so on are examplex.

Silicon carbide microencapsulated with the first fluororesin is preferably whisker or flake. Compared to silicon carbide in a form of powder, silicon carbide in a form of whisker or flake provides high electric conductivity with a small amount and easily improves electric conductivity of the coating film, which leads to a coating film with little suffers from electrification. In addition, this results in higher durability of the coating film.

When silicon carbide in a form of whisker (hereinafter referred to as "silicon carbide whisker") is used as silicon carbide, the silicon carbide whisker preferably has a diameter of 0.1 to 2 µm, a length of 2 to 30 µm, and an aspect ratio of 5 to 80. A diameter of less than 0.1 µm causes to break silicon carbide whisker during a mixing process of the fluororesin composite material and lower electric conductivity of the coating film, and a diameter of more than 2 µm causes to increase permeability of the coating film against a chemical substance and lower corrosion resistance, and therefore both are unfavorable. Further, a length of less than 2 µm is unable to exhibit electric conductivity and relaxation of shrinkage stress (improvement of durability) without increasing an additive amount, while a length of more than 30 µm causes to increase the permeability, and therefore they are unfavorable.

In addition, substances microencapsulated with the first fluororesin may contain impurities in addition to silicon carbide. However, it is preferable that an amount of silicone carbide is more or equal to 95% by weight with respect to a total weight of the substances microencapsulated with the first fluororesin. The contained amount of silicon carbide of less than 95% by weight is unfavorable because it causes to increase permeability of the coating film and lower corrosion resistance and/or increase elution of metal.

For commercially available silicon carbide whiskers which meet these conditions, TWS-100 and TWS-200 (made by TOKAI CARBON Co., Ltd.) and so on are examplex.

The contained amount of silicon carbide is preferably 2 to 18% by weight with respect to a total weight of the first fluororesin and the silicon carbide. The contained amount of silicon carbide of 2 to 18% by weight enables to prevent a shrinkage of the coating film during a coating film forming process of the coating film and improve smoothing of a surface of the coating film.

For the first fluororesin microencapsulating silicon carbide, MPE-101 (2.5% by weight silicon carbide whisker is contained) and MPE-103 (10% by weight silicon carbide whisker is contained), both are made by Du Pont-Mitsui Fluorochemicals Co., Ltd, and so on are examplex. However, in order to achieve electric conductivity of the formed coating film and the prevention of shrinkage of the coating film during the film forming process, the contained amount of silicon carbide is preferably 2.5 to 10% by weight with respect to the total weight of the first fluororesin and silicon carbide. Therefore, MPE-103 is more preferable than MPE-101.

The second fluororesin is a fluororesin having a melt flow rate (MFR) larger than the first fluororesin.

The difference of the melt flow rates (MFR) between the first fluororesin and the second fluororesin does not allow them to mix each other completely and allows them to exist independently, which is a structurally close condition when filler is added thereto. Therefore, this enables to exhibit the same effects as when filler is added thereto. Specifically, this improves durability and electric conductivity of the coating film and suppresses elution of metal. Because MFR of the second fluororesin is larger than that of the first fluororesin, it is possible to improve the melt flow in the entire fluororesin composite material (or coating film) and improve smoothing of the surface of the coating film even though including a high amount of silicon carbide.

For a specific MFR of the second fluororesin, 3 to 13 g/10 minutes is preferable and 5 to 10 g/10 minutes is more preferable, under 5 kg load at 372° C. The reasons are that MFR of the second fluororesin of less than 3 g/10 minutes makes it difficult to form a smooth coating film and that MFR of the second fluororesin of more than 13 g/10 minutes makes it difficult to increase a film thickness of the coating film due to high flowability in the entire film. In addition, MFR of the second fluororesin of more than 13 g/10 minutes causes a problem of lowering corrosion resistance of the coating film.

An average particle diameter of the second fluororesin is preferably 1 to 300 µm, and more preferably 5 to 100 µm. The reason is that an average particle diameter of the second fluororesin of less than 1 µm or more than 300 µm easily causes a bubbling during a coating process and does not allow to increase the film thickness.

For the second fluororesin, polytetrafluoroethylene (PTFE), tetrafluoroethylene-perfluoroalkyl vinyl ether copolymer (PFA), tetrafluoroethylene hexafluoropropylene copolymer (FEP), polyvinylidene fluoride copolymer (PVDF), polychlorotrifluoroethylene copolymer (PCTFE), chlorotrifluoroethylene-ethylene copolymer (ECTFE), tetrafluoroethylene-ethylene copolymer (ETFE) and so on are examplex.

A contained amount of silicon carbide is preferably 6 to 9% by weight with respect to a total of the fluororesin composite material (or coating film). The contained amount of less than 6% or more than 9% by weight is not preferable because that causes problems such as a bubbling during a coating process, electrification of the coating film due to a decrease of electric conductivity and a decrease of corrosion resistance of the coating.

The contained amount of the first fluororesin is preferably 51 to 90% by weight with respect to a total of the fluororesin (a total of the first fluororesin and the second fluororesin). A contained amount of less than 51% by weight causes a bubbling during a coating process, and a contained amount of more than 90% by weight causes surface roughness after the coating film formation. Although fewer contained amount of silicon carbide microencapsulated with the first fluororesin allows to provide the coating film with a smooth surface, the decreased contained amount of silicon carbide is not preferable because that lowers electric conductivity of the coating film and charges the coating film.

In addition to the first fluororesin and the second fluororesin, at least one of polyphenylene sulfide (PPS), polyether sulphone (PES) and polyether ether ketone (PEEK) is added to the fluororesin composite material according to this embodiment. An addition of these substances (Hereinafter, referred to as "PPS etc.") improves processability of the coating film. Non-inclusion of PPS etc. is not preferable because that causes a bubbling in the coating film.

An amount of PPS etc. is not particularly limited, however, it is preferably 3 to 10% by weight with respect to the fluororesin composite material or the coating film. The amount of PPS etc. of less than 3% by weight is unable to sufficiently improve corrosion resistance and/or achieve a prevention of a bubbling and improve the coating executability during a film forming process, and the amount of PPS etc. of more than 10% by weight may cause problems such as a chemical degradation of PPS etc. and have a high possibility of decreasing corrosion resistance depending on conditions, and therefore they are not preferable. The reason of the degradation of PPS etc. resulting from the amount of PPS etc. of more than 10% is that PPS has corrosion resistance inferior to the fluororesin.

For commercial goods of PPS, Ryton V-1 made by Chevron Phillips Chemical Company LLC and so on are examined.

Next, a method for forming the coating film according to this embodiment as well as a coated body having the coating film will be explained.

The coating film of this embodiment is formed on a substrate via a primer layer.

Figure 1:
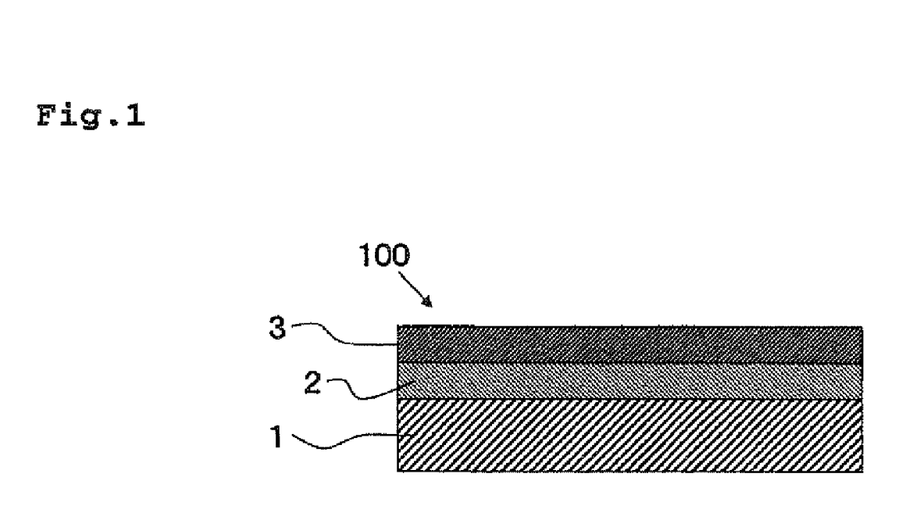
FIG. 1 is a cross-section view of a coated body forming a primer layer and a coating film on a substrate.

FIG. 1 shows a cross-section view of a coated body (100) which forms a coating film (3) on a substrate (1) via a primer layer (2).

For the substrate (1), metal, glass, ceramics and so on are preferably used, which have resistance to heat during a curing process when the curing process is performed to form the primer layer (2) and the coating film (3) on the substrate (1), however, not limited thereto. Among them, metal is preferable because of high corrosion resistance.

The substrate (1) may be preliminarily treated with surface treatments (blasting, plating, silane coupling and so on) to enhance adherability to the primer (2).

The primer (2) is formed on the substrate (1). The formation of the primer layer (2) on the substrate (1) improves adherability between the substrate (1) and the coating film (3).

Specifically, a material of the primer layer (2) is applied to the substrate (1), and a drying process and/or a curing process are performed as needed to form the primer layer (2).

The primer layer (2) preferably comprises the fluororesin and organic titanate. The fluororesin provides corrosion resistance and high-temperature resistance. The organic titanate provides high durability. Although filler included in the fluororesin generally reduces corrosion resistance and high-temperature resistance of the fluororesin, the organic titanate included in the fluororesin enables to maintain high corrosion resistance and high-temperature resistance of the primer layer (2). This is because organic titanate includes a component which contributes to an adherence of the substrate (1) comprising metal and so on and has an inorganic character.

Here, when forming the primer layer (2) by using an aqueous paint, any organic titanate can be included in the primer layer (2) as long as they are soluble in water and stable in water at a certain level to keep the stability of the primer layer (2) until a coating process is over (specifically, titanium lactate and titanium triethanol aminate). For example, alkoxy titanium, titanium acylate or titanium chelate including Ti—O—C bond and formed, by a compound comprising any one of Ti (IV) or Ti (III) and any one of alcoholic hydroxyl group, phenolic hydroxyl group or carboxyl group may be used. Among them, titanium diisopropoxy bis(triethanol aminate) or its analogous compound is preferably used in view of solubility and stability in water. Organic titanate may be titanium lactate, ammonium titanium lactate, titanium acetylacetonate ammonium lactate, or a condensation product of diisopropoxy titanium bis acetylacetonate.

For organic titanate in the primer layer (2), Ti component of organic titanate is preferably included at 4 to 40% by weight, and more preferably at 9 to 23% by weight, with respect to the fluororesin. This is because that the inclusion of Ti component of 4 to 40% by weight enables to exhibit good steam resistance and reduce effects on the environment.

In addition, the primer layer may include surfactant, colorant, pH adjuster, conductive additive and so on as needed.

After the primer layer (2) is formed, the coating film (3) is formed on the primer layer (2) by using the fluororesin composite material.

The fluororesin composite material is made by mixing at least one of polyphenylene sulfide (PPS), polyether sulphone (PES) and polyether ether ketone (PEEK) in addition to the first fluororesin microencapsulating silicon carbide and the second fluororesin having a different MFR from the first fluororesin. Then, the fluororesin composite material is applied to the primer layer (2) by means of an electrostatic powder coating, and a curing process is performed, and they are repeated to form the coating film (3).

A mixing time of the fluororesin composite material depends on mixing conditions, however, it is preferable to mix them in a short time as possible. An increase of the mixing time decreases electric conductivity of the coating film (3). The decrease of electric conductivity is considered to be resulted from a fracture of silicon carbide. For a method for mixing the fluororesin and so on, Henschel mixer and so on are examined, however, it is not limited thereto.

For conditions for curing the primer layer (2) and the coating film (3), a condition of 5 to 180 minutes at 300 to 450° C. is examined, however, it is not limited thereto. The curing of the primer layer (2) may be carried out, for example by means of an electric oven.

It is possible that a fluororesin paint is applied and cured on the coating film (3) of this embodiment as needed to form a coating film (hereinafter referred to as "second coating film") which is different from the coating film (3) and including fluororesin.

Figure 2:
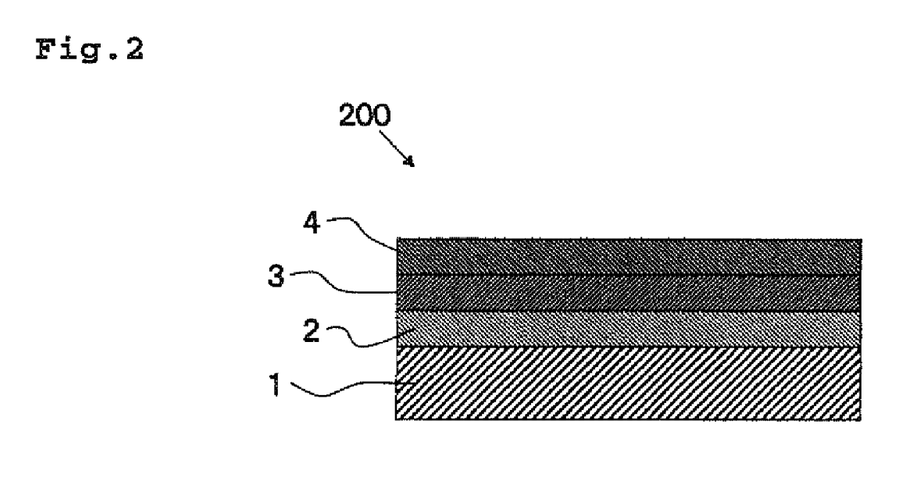
FIG. 2 is a cross-section view of a coated body forming a primer layer, a first coating film and a second coating film on a substrate.

FIG. 2 shows a diagram illustrating a coated body (200) comprising a structure (hereinafter, referred to as "three layered structure"), wherein the primer layer (2), the coating film (3) and the second coating film (4) are sequentially formed on the substrate (1). In the coated body (200), the coating film (3) is referred to as the first coating film (3).

The formation of the second coating film (4) on the first coating film (3) makes it possible to maintain high corrosion resistance.

Especially, when a primer layer including the fluororesin and organic titanate is used as the primer (2), the three layered structure shown in FIG. 2 exhibits the following effects. Although it is not possible to exhibit high durability with the primer layer (2) including the fluororesin and organic titanate when stainless steel is used as the substrate (1), it is able to exhibit high durability in combination with the first coating film (3) according to this embodiment even when stainless steel is used as the substrate (1).

For the three layered structure shown in FIG. 2, it is preferable to ensure that a film thickness of the first coating film (3) is more or equal to 25% of a total film thickness (a total film thickness of the primer layer (2), the first coating film (3) and the second coating film (4)). The first coating film (3) having a film thickness of less than 25% may not able to show enough performance of preventing a shrinkage depending on the fluororesin composite material used in the coating film.

For the second coating film (4), it is more preferable to use the coating film according to the present invention. This allows the second coating film (4) to also have electric conductivity, and certainly prevents the coated body (200) from electrification. In addition, it is possible not to include PPS and so on in the second coating film (4). That is, a coating film comprising only the first fluororesin microencapsulating silicon carbide and the second fluororesin may be used as the second coating film (4). The inclusion of PPS and so on in the first coating film (3) exhibits effects resulting from the inclusion of PPS, even though the second coating film (4) does not include PPS and so on.

For conditions for curing the fluororesin composite material, a curing condition of 5 to 180 minutes at 300 to 380° C. is exampled, however, it is not limited thereto. Such the curing may be carried out, for example by means of an electric oven.

EXAMPLES

Hereinafter, Examples for evaluating the fluororesin composite material, the coating film and the coated body of the present invention are shown to clarify effects of the present invention. However, the present invention is not limited to the following Examples.

Example A

First, a method for forming a coating film used in Example A will be explained.

In order to form a coated body having a coating film used in Example A, first of all, a blasting was performed on a substrate and a primer layer was formed.

For the substrate, SS400 (6 mm thickness, 200 mm square) comprising carbon steel was used.

The primer layer was formed by mixing the following (I) and (II) at a ratio of 2:3 by weight, adjusting viscosity with water and performing a curing process at 400° C. for 60 minutes.

(I) Orgatix TC-400 (made by Matsumoto Pharmaceutical Manufacture Co., Ltd; an isopropyl alcohol dispersion containing 80% titanium triethanol aminate (titanium diisopropoxy bis))

(II) EM-514CL (made by Du Pont-Mitsui Fluorochemicals Co., Ltd; a water-dispersed paint containing 40% tetrafluoroethylene-perfluoroalkyl vinyl ether copolymer PFA dispersion paint)

After that, a fluororesin composite material was applied to the primer layer by means of an electrostatic powder coating, and the curing process was performed at 400° C. for 60 minutes. Further, the application process of the fluororesin composite material and the curing process at 360° C. for 60 minutes were repeated to form a coating film with a film thickness of more or equal to 400 μm and form a coated body according to Example A.

Hereinafter, the coating film used in Example A will be explained with more details.

Based on Blend Examples shown in Table 1, (i) to (iv) in Table 1 were blended together and mixed with a blender for 20 seconds to obtain a fluororesin composite material which was a material for the coating film used in Example A.

In addition, (i) to (iv) in Table 1 were as below. Blend Examples 1 to 10 were blended at a ratio by weight shown in Table 1. (i) and (ii) were a first fluororesin which microencapsulates silicon carbide whisker, (iii) was a second fluororesin and (iv) was PPS.

(i) MPE-103 (made by Du Pont-Mitsui Fluorochemicals Co., Ltd; PFA powder paint microencapsulating 10% by weight of silicon carbide whisker, wherein a base resin is Teflon (Registered trademark) 350J (made by Du Pont-Mitsui Fluorochemicals Co., Ltd), and MFR of the contained fluororesin is 2 g/10 minutes)

(ii) MPE-101 (made by Du Pont-Mitsui Fluorochemicals Co., Ltd.; PFA powder paint microencapsulating 2.5% by weight of silicon carbide whisker, wherein a base resin is Teflon (Registered trademark) 350J (made by Du Pont-Mitsui Fluorochemicals Co., Ltd), and MFR of the contained fluororesin is 2 g/10 minutes)

(iii) AC5600 (made by DAIKIN INDUSTRIES, Ltd.; PFA powder paint, wherein MER of the contained fluororesin is 6 g/10 minutes, and an average particle diameter is 50 μm)

(iv) Ryton V-1 (made by Chevron Phillips Chemical Company LLC; PPS)

Further, (a) to (c) in Table 1 showed the following values.

(a) A contained amount of the first fluororesin (% by weight) with respect to a total of the fluororesin (a total of the first fluororesin and the second fluororesin)

(b) A contained amount of silicon carbide whisker with respect to the fluororesin composite material or the coating film (% by weight)

(c) A contained amount of PPS (% by weight) with respect to the fluororesin composite material or the coating film

TABLE 1

| | (i) MPE-103 | (ii) MPE-101 | (iii) AC-5600 | (iv) RytonV-1 | (a) Amount of the First Fluororesin | (b) Amount of Silicon Carbide | (c) Amount of PPS |
|---|---|---|---|---|---|---|---|
| Blend Ex. 1 | 200 | | 100 | 15 | 66.7 | 6.35 | 4.76 |
| Blend Ex. 2 | 150 | 100 | | 12.5 | 100 | 6.67 | 4.76 |
| Blend Ex. 3 | 200 | | 25 | 11.25 | 88.9 | 8.47 | 4.76 |
| Blend Ex. 4 | 125 | | 100 | 11.25 | 55.6 | 5.29 | 4.76 |
| Blend Ex. 5 | 200 | | 100 | 10 | 66.7 | 6.45 | 3.23 |
| Blend Ex. 6 | 200 | | 100 | 33.3 | 66.7 | 6.00 | 9.99 |
| Blend Ex. 7 | 200 | | 100 | 0 | 66.7 | 6.67 | 0 |
| Blend Ex. 8 | 200 | | | 10 | 100 | 9.52 | 4.76 |
| Blend Ex. 9 | | 100 | | 5 | 100 | 2.38 | 4.76 |
| Blend Ex. 10 | 100 | | 100 | 10 | 50 | 4.76 | 4.76 |

Blend Examples 1 to 10 were used to form coating films of Examples 1 to 5 and Comparative Examples 1 to 6 on primer layers as shown in Table 2. For Comparative Example 7, a coating film including a lower layer and an upper layer was formed. The lower layer was MP-501 (made by Du Pont-Mitsui Fluorochemicals Co., Ltd; PFA powder paint including 10% glass flake and 5% polyphenylene sulfide (PPS), wherein MFR of the contained fluororesin is 2 g/10 minutes). The upper layer was NC-1539N (made by DAIKIN INDUSTRIES, Ltd; PFA powder paint, wherein MFR of the contained fluororesin is 1 g/10 minutes, and an average particle diameter is 50 μm). Here, MP-501 and NC-1539N do not contain silicon carbide. For Comparative Example 8, a coating film of MP-623 (made by Mitsui Fluorochemicals Co., Ltd.; PFA powder paint microencapsulating 30% by weight of silicon carbide, wherein MFR of the contained fluororesin is 14 g/10 minutes) was formed.

For Comparative Example 9, a fluororesin composite material (referred to as Blend Example 11) was used to form a coating film. The fluororesin composite material included MPE-103, MP-103 (made by Du Pont-Mitsui Fluorochemicals Co., Ltd.; PFA powder paint, wherein MFR of the contained fluororesin is 2 g/10 minutes) and Ryton V-1 at a ratio of 125:100:11.25 by weight. Here, MP-103 does not contain silicon carbide. Values of Blend Example 11 corresponding to (a) to (c) in Table 1 were respectively (a) 55.6% by weight, (b) 5.29% by weight, and (c) 4.76% by weight.

TABLE 2

|  | Composite Material (lower layer) | Composite Material (upper layer) |
| --- | --- | --- |
| Ex. 1 | Blend Ex. 1 | — |
| Ex. 2 | Blend Ex. 3 | — |
| Ex. 3 | Blend Ex. 5 | — |
| Ex. 4 | Blend Ex. 6 | — |
| Ex. 5 | Blend Ex. 1 | Blend Ex. 7 |
| Comp Ex. 1 | Blend Ex. 7 | — |
| Comp Ex. 2 | Blend Ex. 8 | — |
| Comp Ex. 3 | Blend Ex. 9 | — |
| Comp Ex. 4 | Blend Ex. 10 | — |
| Comp Ex. 5 | Blend Ex. 2 | — |
| Comp Ex. 6 | Blend Ex. 4 | — |
| Comp Ex. 7 | MP-501 | NC-1539N |
| Comp Ex. 8 | MP-623 | — |
| Comp Ex. 9 | Blend Ex. 11 | — |

For a curing coating of Examples 1 to 5 and Comparative Examples 1 to 9 in Table. 2, following evaluation tests (1) to (4) were performed. Evaluation results of Examples 1 to 5 were shown in Table 3, and those of Comparative Examples 1 to 9 were shown in Table 4.

(1) Coating Performance and Processability

A coating performance of the coating film by means of an electrostatic powder coating was evaluated. ○ was shown when there was no problem for the coating performance. x was shown when coating-adherence was not achieved without heating the substrate at a temperature higher than a melting point of the substrate or when a bubbling occurred during the process. In addition, observed states were also specifically described in Tables 3 and 4.

(2) Surface State after Curing Process

After the coating film was formed (after a curing process), a surface state of the coating film was evaluated. ○ was shown when the fluororesin composite material was enough melted on the surface of the coating film. Δ was shown when the surface is not smooth although the fluororesin composite material was melted. x was shown when the fluororesin composite material was not completely melted and a roughness was left on the surface or a bubbling occurred inside the coating film. In addition, observed states were also specifically described in Tables 3 and 4

(3) Film Thickness

A film thickness of the coating film was measured with a magnetic induction method thickness meter. Specifically, average, maximum and minimum values of the film thickness were measured. In addition, 10 places within 60 mm radius from a center of the formed coating film (an area of a corrosion resistance test by Lining Tester) were used for the measurement. In Tables 3 and 4, a value described at the beginning was the average value, and values described in a bracket were the maximum value and the minimum value, and their units were μm.

(4) Leakage Resistance

Leakage resistance was measured with a leakage resistance meter under an applied voltage of 100V. Then, ○ was shown when the leakage resistance was less than $1 \times 10^7 \Omega$, Δ was shown when it was more or equal to $1 \times 10^7$ Ω and less than $1 \times 10^9 \Omega$, and x was shown when it was more or equal to $1 \times 10^9 \Omega$. In addition, actual measured leakage resistances were described in Tables 3 and 4. In Example A, a measuring area of the leakage resistance was between $1 \times 10^6 \Omega$ and $1 \times 10^{11} \Omega$. Therefore, "<$10^6$" was described when the leakage resistance was less than $1 \times 10^6 \Omega$, and ">$10^{11}$" was described when it was more than $1 \times 10^{11} \Omega$.

TABLE 3

|  | Ex. 1 | Ex. 2 | Ex. 3 | Ex. 4 | Ex. 5 |
| --- | --- | --- | --- | --- | --- |
| Composite Material (lower layer) | Blend Ex. 1 | Blend Ex. 3 | Blend Ex. 5 | Blend Ex. 6 | Blend Ex. 1 |
| Composite Material (upper layer) | — | — | — | — | Blend Ex. 7 |
| Coating Performance and Processability | ○ (good) | ○ (good) | ○ (good) | ○ (good) | ○ (good) |
| Surface State after Curing Process | ○ (good) | Δ-○ (slight roughness) | ○ (good) | Δ-○ (slight roughness) | ○ (good) |
| Film Thickness (μm) | 604 (570-644) | 570 (520-610) | 660 (542-741) | 652 (542-721) | 492 (446-524) |
| Leakage Resistance(Ω) | ○ <$10^6$ | ○ <$10^6$ | ○ <$10^6$ | ○ <$10^6$ | Δ $1.7 \times 10^7$ |

TABLE 4

|  | Comp Ex. 1 | Comp Ex. 2 | Comp Ex. 3 | Comp Ex. 4 | Comp Ex. 5 | Comp Ex. 6 | Comp Ex. 7 | Comp Ex. 8 | Comp Ex. 9 |
|---|---|---|---|---|---|---|---|---|---|
| Composite Material (lower layer) | Blend Ex. 7 | Blend Ex. 8 | Blend Ex. 9 | Blend Ex. 10 | Blend Ex. 2 | Blend Ex. 4 | MP-501 | MP-623 | Blend Ex. 11 |
| Composite Material (upper layer) | — | — | — | — | — | — | NC-1539N | — | — |
| Coating Performance and Processability | X (bubbling during process) | ○ (good) | ○ (good) | X (bubbling during process) | ○ (good) | ○ (good) | ○ (good) | X (bubbling during process) | ○ (good) |
| Surface State after Curing Process | X (bubbling during process) | X (roughness) | ○ (good) | X (bubbling during process) | ○ (good) | ○ (good) | ○ (good) | X (bubbling during process) | X (roughness) |
| Film Thickness (Maximum-Minimum) | — | 562 (500-588) | 578 (508-627) | — | 591 (526-626) | 570 (484-635) | 742 (717-823) | — | 670 (578-725) |
| Leakage Resistance($\Omega$) | — | ○ <$10^6$ | X >$10^{11}$ | — | Δ $2.20 \times 10^8$ | X $3.32 \times 10^{11}$ | — | — | ○ <$10^6$ |

As shown in Table 3, Examples 1 to 5 were all good for the coating performance and processability. Also, they were basically good for the surface state after the curing, although a slight roughness was observed in Examples 2 and 4.

Examples 1, 2, 3 and 4 showed that their leakage resistances were enough low. The lowness of the leakage resistance meant that the coating film had little suffers from electrification. That is, Examples 1, 2, 3 and 4 had enough electric conductivity.

By contrast, Comparative Examples 2 to 4 and 6 had a contained amount of silicon carbide (silicon carbide whisker in this Example) out of 6 to 9% by weight (described above as a favorable range), and such the cases caused a bubbling in the coating film and high leakage resistance, which were not preferable. The high leakage resistance indicated that the coated body had low electric conductivity and easily caused electrification.

As shown in Comparative Example 1, no inclusion of PPS caused the coating film to have a bubbling, which was unfavorable.

Here, the above description mentions that the first fluororesin is preferably included 51 to 90% by weight with respect to the total fluororesin. In response to that, the content amount of less than 51% by weight caused a bubbling (see Comparative Example 4) and the content amount of more than 90% by weight caused a roughness on the surface after the curing process (see Comparative Example 2) or an increase of the leakage resistance (see Comparative Example 3), which were unfavorable.

As shown in Comparative Example 8, the microencapsulation of silicon carbide with a fluororesin having a large MFR caused the coating film to have a bubbling, which was unfavorable.

Further, as shown in Comparative Example 9, an addition of fluororesin having the same MFR of the first fluororesin (a fluororesin having MFR not larger than the first fluororesin) to the first fluororesin caused a roughness on the surface after the curing process, which was unfavorable.

(Corrosion Resistance Test)

A corrosion resistance test was performed with Lining Tester LA-15 (made by Yamasaki-seiki Co., Ltd.) for the coated bodies of the prepared Examples 1 to 5 and Comparative Examples 2 and 3. Specifically, they were with 5% hydrochloric acid for 500 hours under a temperature condition of 100° C. for the corrosion resistance test. As Comparative Example 10, a fluororesin coating film (made by NIPPON FUSSO Co., Ltd. an average film thickness is 742 μm (minimum 717 μm, maximum 823 μm)) including a lower layer and an upper layer was with 5% hydrochloric acid for 375 hours under a temperature condition of 100° C. for the corrosion resistance test. The lower layer was MP-501 (made by Du Pont-Mitsui Fluorochemicals Co., Ltd.; PFA powder paint including 10% glass flake and 5% polyphenylene sulfide (PPS), wherein MFR of the contained fluororesin is 2 g/10 minutes). The upper layer was NC-1539N (made by DAIKIN INDUSTRIES, Ltd.; PFA powder paint, wherein MFR of the contained fluororesin is 1 g/10 minutes, and an average particle diameter is 50 μm). The evaluated results of Examples 1 to 5 were shown in Table 5, and those of Comparative Examples 2, 3 and 10 were shown in Table 6.

Specifically, the following three items (5) to (7) were evaluated.

(5) Initial Adhesion Performance

For the coating film before being with hydrochloric acid, a peel strength test within 5 mm width was performed based on JIS K 5400 definition so as to evaluate an initial adhesion performance to the substrate. Compared to Comparative Example 10, ○ was shown when a value was the same, ⊚ was shown when it was more, Δ was shown when it was below, and X was shown when it was less than the half. However, ○ was shown regardless the value when the coating was fractured, because this depended on the film thickness. Specific adhesion performance was described in Tables 5 and 6. "Coating fracture" was described when the fracture was confirmed in the coating film.

(6) Time Until Blister (Swelling) Formation

Time until blister formation was measured when the coating film was with 5% hydrochloric acid under a temperature condition of 100° C. Compared to Comparative Example 10, ○ was shown when a value was the same, ⊚ was shown when it was more, Δ was shown when it was below, and X was shown when it was less than the half. Specific time when the blister occurred was described in Tables 5 and 6. For Comparative Example 2, the blister was confirmed in a vicinity of a packing where it was difficult to observe the blister after the 500 hours test, however, it was not possible to specify the formation time of the blister due to an entry of a large amount of hydrochloric acid.

(7) Adhesion Performance after 500 Hours

A peel strength test based on JIS K 5400 definition was performed to evaluate an adhesion performance to the substrate after 500 hours (375 hours for Comparative Example 10). Compared to Comparative Example 10, ○ was shown when a value was the same, ◎ was shown when it was more, Δ was shown when it was below, and x was shown when it was less than the half. Because the coating film after having a hydrochloric acid treatment was divided into a gaseous phase part and a liquid phase part, the adhesion performance of each part was respectively measured. Columns of the adhesion performance after 500 hours in Tables 5 and 6 showed the adhesion performance of the gaseous phase in an upper stage and the adhesion performance of the liquid phase in a lower stage. Tables 5 and 6 described the measured values (kgf/5 mm) of the peel strength, and also "coating fracture" when fracture was confirmed in the coating film. In addition, the peel strength test sometimes showed different values depending on measured places, and in that case, the measured values were described as (minimum value of the measured values)–(maximum value of the measured values) in Tables 5 and 6.

For the evaluated results, Examples 1 to 5 were shown in Table 5, and Comparative Examples 2, 3 and 10 were shown in Table 6.

As shown in Tables 5 and 6, Comparative Examples 3 and 10 caused a blister before 500 hours, passed (Comparative Example 2 was impossible to be measured), while Examples 1 to 5 did not cause a blister even after 500 hours.

Further, Examples 1 to 5 basically had the adhesion performance more than Comparative Example 10.

The above results showed that the coating film according to the present invention excelled in the corrosion resistance.

In addition, Comparative Example 2 was able to maintain very high adhesion performance in a good condition place, however, it caused a blister including a large amount of chemical substance in a place where it was difficult to observe the blister during the corrosion resistance test. The reason was considered that Comparative Example 2 easily caused a defection of the film due to high amount of silicon carbide whisker. Also, Comparative Example 2 was not able to provide a smooth surface by means of a standard curing process, which was unsuitable as the coating film.

TABLE 5

|  | Ex. 1 | Ex. 2 | Ex. 3 | Ex. 4 | Ex. 5 |
|---|---|---|---|---|---|
| Composite Material (lower layer) | Blend Ex. 1 | Blend Ex. 3 | Blend Ex. 5 | Blend Ex. 6 | Blend Ex. 1 |
| Composite Material (upper layer) | — | — | — | — | Blend Ex. 7 |
| Initial Adhesion Performance (kgf/5 mm) | ○ >4 fracture in coating film | ○ >3 fracture in coating film | ○ >3 fracture in coating film | ○ >3 fracture in coating film | ○ >3 fracture in coating film |
| Time until Blister Formation(h) | ◎ (no formation after 500 hours) | ◎ (no formation after 500 hours) | ◎ (no formation after 500 hours) | ◎ (no formation after 500 hours) | ◎ (no formation after 500 hours) |
| Adhesion Performance after 500 hours passed (kgf/5 mm) | ◎ 3.5-4.2< fracture in coating film ◎ 3.5-4.2< fracture in coating film | ◎ >2.8 fracture in coating film ○-◎ >2.9 fracture in coating film | ◎ 2.5->3.8 fracture in coating film ◎ >3.3 fracture in coating film | ◎ 2.8-3.2 fracture in coating film ◎ >4.2 fracture in coating film | ◎ >3.0 fracture in coating film ◎ >3.0 fracture in coating film |

TABLE 6

|  | Comp Ex. 2 | Comp Ex. 3 | Comp Ex. 10 |
|---|---|---|---|
| Composite Material (lower layer) | Blend Ex. 8 | Blend Ex. 9 | MP-501 |
| Composite Material (upper layer) | — | — | NC-1539N |
| Initial Adhesion performance (kgf/5 mm) | ○ >3 fracture in coating film | ○ >4 fracture in coating film | ○ >4 fracture in coating film |
| Time until Blister Formation(h) | — | Δ (177 hours) | ○ (275 hours) |
| Adhesion Performance after 500 hours (kgf/5 mm) | ◎ >3.0 fracture in coating film ○-◎ >3.0 fracture in coating film | Δ-◎ 0.6-2.0 X-○ 0.9-3.0 | ○ 1.2-1.5 ○ 2.3-3.5 (after 375 hours) |

Example B

Next, a coating film according to the present invention was formed on a primer layer including organic titanate and a fluororesin. On this coating film, a coating film (second coating film) comprising a fluororesin was further formed. The obtained coated body was evaluated (See FIG. 2).

In order to form a fluororesin composite material used in Example B, first of all, a blasting was performed on a substrate to form a primer layer.

For the substrate, SUS304 (6 mm thickness, 200 mm square), which is a stainless steel substrate, was used.

The primer layer was formed by mixing the following (I) and (II) at a ratio of 2:3 by weight, adjusting viscosity with water and performing a curing process at 400° C. for 60 minutes.

(I) Orgatix TC-400 (made by Matsumoto Pharmaceutical Manufacture Co., Ltd.; an isopropyl alcohol dispersion containing 80% titanium diisopropoxy bis(triethanol aminate))
(II) EM-514CL (made by Du Pont-Mitsui Fluorochemicals Co., Ltd.; a water dispersed paint containing 40% tetrafluoroethylene-perfluoroalkyl vinyl ether copolymer PFA dispersion paint)

Further, a fluororesin composite material shown in a column of the composite material (lower layer) of Table 7 was applied to the primer layer, and a curing process was performed at 400° C. for 60 minutes. Further, the application process of the fluororesin composite material and the curing process at 360° C. for 60 minutes were repeated three times to form a lower layer (first coating film). Then, an application process of applying a fluororesin composite material shown in a column of the composite material (upper layer) of Table 7 on the lower layer and a curing process at 340 to 360° C. for 60 to 120 minutes were repeated to form an upper layer (second coating film), and Examples 6 to 8 and Comparative Example 11 were obtained.

As Comparative Example 12, a coated body made by forming NF-240 (made by NIPPON FUSSO Co., Ltd. FEP/PFA composite coating) on the SUS304 substrate via a primer layer including chromic acid was used. As Comparative Example 13, a coated body made by forming NF-020AC (made by NIPPON FUSSO Co., Ltd. PFA coating) on the SUS304 substrate via a primer layer including chromic acid was used. Here, the primer layers including chromic acid such as Examples 12 and 13 are said to exhibit excellent corrosion resistance when a fluororesin is formed thereon.

All of Examples 6 to 8 and Comparative Examples 11 to 13 had a film thickness of more than 500 μm.

For Examples 6 to 8 and Comparative Examples 11 to 13, coating performance and processability, a surface state after a curing process, a film thickness of the coating film were evaluated. The method for the evaluation was the same as Example A (1) to (3), and the results were shown in Table 7. In addition, observed states were specifically described in Table 7.

A corrosion resistance test was performed with Lining Tester LA-15 (made by Yamasaki-seiki Co., Ltd.) for the coating films of Examples 6 to 8 and Comparative Examples 11 to 13, and results were shown in Table 8. A Specific method for the evaluation was the same as Example A (5) to (7). Compared to Comparative Example 12, ○ was shown when a value was the same, ⊚ was shown when it was more, Δ was shown when it was below, and X was shown when it was less than the half.

TABLE 7

| | | Ex. 6 | Ex. 7 | Ex. 8 | Comp Ex. 11 | Comp Ex. 12 | Comp Ex. 13 |
|---|---|---|---|---|---|---|---|
| Composite Material (lower layer) | | Blend Ex. 1 | Blend Ex. 1 | Blend Ex. 3 | MP-501 | PFA | PFA |
| Composite Material (upper layer) | | NC-1539N | Blend Ex. 7 | Blend Ex. 7 | NC-1539N | FEP | PFA |
| Coating Performance and Processability | | ○ (good) | ○ (good) | ○ (good) | ○ (good) | ○ (good) | ○ (good) |
| Surface State after Curing Process | | ○ (good) | ○ (good) | Δ-○ (slight roughness) | ○ (good) | ○ (good) | ○ (good) |
| Film Thickness (μm) Average (Minimum-Maximum) | Only Lower Layer | 266 (236-292) | 453 (404-512) | 346 (300-398) | 93.2 (80.2-107) | — | — |
| | Total | 733 (689-766) | 642 (527-722) | 567 (506-631) | 670 (590-715) | 644 (577-692) | 712 (638-758) |

TABLE 8

| | Ex. 6 | Ex. 7 | Ex. 8 | Comp Ex. 11 | Comp Ex. 12 | Comp Ex. 13 |
|---|---|---|---|---|---|---|
| Composite Material (lower layer) | Blend Ex. 1 | Blend Ex. 1 | Blend Ex. 3 | MP-501 | PFA | PFA |
| Composite Material (upper layer) | NC-1539N | Blend Ex. 7 | Blend Ex. 7 | NC-1539N | FEP | PFA |
| Initial Adhesion Performance (kgf/5 mm) | ○ >4 fracture in coating film | ○ >4 fracture in coating film | ○ >4 fracture in coating film | ○ >4 fracture in coating film | ○ >4 fracture in coating film | ○ >4 fracture in coating film |
| Time until Blister Formation(h) | ○-◎ (very small blister is found after 250 hours) | ◎ (no formation after 500 hours) | ◎ (no formation after 250 hours) | Δ 120 hours | ○ 224 hours | Δ 144 hours |
| Adhesion Performance after 250 hours passed (kgf/5 mm) | ◎ 3.3-4.7< fracture in coating film ◎ >5.0 fracture in coating film | ◎ 3.5-4.3< fracture in coating film ◎ >4.1 fracture in coating film | ○ 1.9-3.4 ○ 1.3-3.0< fracture in coating film | X 0.2-0.3 Δ-○ 1.4-1.6 | ○ 1.6-2.7 ○ 1.2-3.3 | Δ-○ 1.2-2.0 Δ-○ 1.1-2.0 |

For the coating performance and processability and the surface state after the curing process, Examples and Comparative Examples basically showed good results although Example 8 showed slight roughness on the surface state after the curing process. By contrast, Examples 6 to 8 showed more excellent results than Comparative Examples 11 to 13 for the corrosion resistance including both the time until blister formation and the adhesion performance after 250 hours. That is, Examples 6 to 8 showed more superior corrosion resistance compared to Comparative Examples 11 to 13.

The primer layer used in Example B was the primer layer including the fluororesin and organic titanate, however, such the primer layer was not able to provide enough corrosion resistance when the fluororesin was formed thereon and the substrate was stainless steel (Comparative Example 11). However, the formation of the coating film according to the present invention on the primer layer was able to exhibit very excellent corrosion resistance even stainless steel was used as the substrate (Examples 6 to 8). Further, as shown in Examples 7 and 8, the use of the coating film comprising the first fluororesin microencapsulating silicon carbide and the second fluororesin as the upper layer (second coating film) exhibited further excellent corrosion resistance. Although a formation of fluororesin on the primer layer including chromic acid such as Comparative Examples 12 and 13 is said to exhibit excellent corrosion resistance, Examples 6 to 8 showed corrosion resistance more excellent than when the primer layer including chromic acid was used, which was very superior corrosion resistance.

Industrial Applicability

The fluororesin composite material and the coating film according to the present invention are preferably applicable for devices which require durability and corrosion resistance.

What is claimed is:

1. A fluororesin composite material with smoothing, electric conductivity and durability comprising:
   a fluororesin including a first fluororesin microencapsulating silicon carbide and a second fluororesin having a melt flow rate larger than the first fluororesin, the melt flow rate of the first fluororesin being 0.1 to 3 g/ 10 minutes, the melt flow rate of the second fluororesin being 5 to 13 g/ 10 minutes, and an amount of the silicon carbide being 6 to 9% by weight with respect to a total of the fluororesin composite material; and
   at least one of polyphenylene sulfide (PPS), polyether sulphone (PBS) and polyether ether ketone (PEEK).

2. The fluororesin composite material with smoothing, electric conductivity and durability according to claim 1, wherein the silicon carbide is whisker or flake.

3. The fluororesin composite material with smoothing, electric conductivity and durability according to claim 2, wherein an amount of the first fluororesin microencapsulating silicon carbide is 51 to 90% by weight with respect to the total of the fluororesin.

4. The fluororesin composite material with smoothing, electric conductivity and durability according to claim 3, wherein an amount of the silicon carbide is 2 to 18% by weight with respect to a total weight of the first fluororesin microencapsulating silicon carbide and the silicon carbide.

5. The fluororesin composite material with smoothing, electric conductivity and durability according to claim 4, wherein a total amount of polyphenylene sulfide (PPS), polyether sulphone (PES) and polyether ether ketone (PEEK) is 3 to 10% by weight with respect to a total weight of the fluororesin composite material.

6. The fluororesin composite material with smoothing, electric conductivity and durability according to claim 3, wherein a total amount of polyphenylene sulfide (PPS), polyether sulphone (PES) and polyether ether ketone (PEEK) is 3 to 10% by weight with respect to the total weight of the fluororesin composite material.

7. The fluororesin composite material with smoothing, electric conductivity and durability according to claim 2, wherein an amount of the silicon carbide is 2 to 18% by weight with respect to a total weight of the first fluororesin microencapsulating silicon carbide and the silicon carbide.

8. The fluororesin composite material with smoothing, electric conductivity and durability according to claim 7, wherein a total amount of polyphenylene sulfide (PPS), polyether sulphone (PES) and polyether ether ketone (PEEK) is 3 to 10% by weight with respect to the total weight of the fluororesin composite material.

9. The fluororesin composite material with smoothing, electric conductivity and durability according to claim 2, wherein a total amount of polyphenylene sulfide (PPS), polyether sulphone (PES) and polyether ether ketone (PEEK) is 3 to 10% by weight with respect to the total weight of the fluororesin composite material.

10. The fluororesin composite material with smoothing, electric conductivity and durability according to claim 1, wherein an amount of the first fluororesin microencapsulating silicon carbide is 51 to 90% by weight with respect to the total of the fluororesin.

11. The fluororesin composite material with smoothing, electric conductivity and durability according to claim 10, wherein an amount of the silicon carbide is 2 to 18% by weight with respect to a total weight of the first fluororesin microencapsulating silicon carbide and the silicon carbide.

12. The fluororesin composite material with smoothing, electric conductivity and durability according to claim 11, wherein a total amount of polyphenylene sulfide (PPS), polyether sulphone (PES) and polyether ether ketone (PEEK) is 3 to 10% by weight with respect to the total weight of the fluororesin composite material.

13. The fluororesin composite material with smoothing, electric conductivity and durability according to claim 10, wherein a total amount of polyphenylene sulfide (PPS), polyether sulphone (PES) and polyether ether ketone (PEEK) is 3 to 10% by weight with respect to the total weight of the fluororesin composite material.

14. The fluororesin composite material with smoothing, electric conductivity and durability according to claim 1, wherein the amount of the silicon carbide is 2 to 18% by weight with respect to a total weight of the first fluororesin microencapsulating silicon carbide and the silicon carbide.

15. The fluororesin composite material with smoothing, electric conductivity and durability according to claim 14, wherein a total amount of polyphenylene sulfide (PPS), polyether sulphone (PES) and polyether ether ketone (PEEK) is 3 to 10% by weight with respect to the total weight of the fluororesin composite material.

16. The fluororesin composite material with smoothing, electric conductivity and durability according to claim 1, wherein a total amount of polyphenylene sulfide (PPS), polyether sulphone (PES) and polyether ether ketone (PEEK) is 3 to 10% by weight with respect to the total weight of the fluororesin composite material.

17. A coating film with smoothing, electric conductivity and durability comprising:
    a fluororesin including a first fluororesin microencapsulating silicon carbide and a second fluororesin having a melt flow rate larger than the first fluororesin, the melt flow rate of the first fluororesin being 0.1 to 3 g/ 10 minutes, the melt flow rate of the second fluororesin being 5 to 13 g/ 10 minutes, and an amount of the silicon carbide being 6 to 9% by weight with respect to a total of the coating film; and
    at least one of polyphenylene sulfide (PPS), polyether sulphone (PES) and polyether ether ketone (PEEK).

18. A coated body having the coating film described in claim 17, wherein a primer layer including the fluororesin and organic titanate and the coating film are sequentially formed on a substrate.

19. The coated body according to claim 18, wherein the coating film is a first coating film, the coated body further comprising a second coating film on the first coating film, the second coating film being different from the first coating film and including fluororesin.

* * * * *